United States Patent
Strand et al.

(10) Patent No.: US 9,189,767 B2
(45) Date of Patent: Nov. 17, 2015

(54) KIOSK FOR RECEIVING AND DELIVERING PACKAGES

(71) Applicants: Lindsay Strand, New York, NY (US); Mekdela Maskal, Brooklyn, NY (US); Anna Rasulova, San Francisco, CA (US); Anand Ilesh Safi, Philadelphia, PA (US); Christopher Li, Bellevue, WA (US); Jayni Shah, San Francisco, CA (US)

(72) Inventors: Lindsay Strand, New York, NY (US); Mekdela Maskal, Brooklyn, NY (US); Anna Rasulova, San Francisco, CA (US); Anand Ilesh Safi, Philadelphia, PA (US); Christopher Li, Bellevue, WA (US); Jayni Shah, San Francisco, CA (US)

(73) Assignee: eBay Inc., San Jose, CA (US)

( * ) Notice: Subject to any disclaimer, the term of this patent is extended or adjusted under 35 U.S.C. 154(b) by 137 days.

(21) Appl. No.: 14/139,172

(22) Filed: Dec. 23, 2013

(65) Prior Publication Data

US 2015/0178677 A1  Jun. 25, 2015

(51) Int. Cl.
*G06Q 10/00* (2012.01)
*G06Q 10/08* (2012.01)

(52) U.S. Cl.
CPC .......... *G06Q 10/0836* (2013.01); *G06Q 10/087* (2013.01)

(58) Field of Classification Search
None
See application file for complete search history.

(56) References Cited

U.S. PATENT DOCUMENTS

2012/0290423 A1* 11/2012 Hoersten .......................... 705/22

* cited by examiner

*Primary Examiner* — Paul Danneman
(74) *Attorney, Agent, or Firm* — Schwegman Lundberg & Woessner, P.A.

(57) ABSTRACT

A computer server for a network-based transaction system is coupled to a kiosk via a data communications network. The kiosk includes a computer processor, an input device, an electronic display unit, a plurality of compartments, and a data communications port. The computer server receives input from a seller of an item. The input includes a listing of the item for sale on the network-based transaction system. The server identifies an available compartment from the plurality of compartments based on the item for sale. The available compartment is configured to receive the item for sale from the seller. The server transmits an identification of the available compartment to the seller via the electronic display unit, and enables access to the available compartment by the seller.

20 Claims, 14 Drawing Sheets

KIOSK FOR RECEIVING AND DELIVERING PACKAGES

TECHNICAL FIELD

This application relates generally to the field of computer technology and, in a specific example embodiment, to a method and system for shipping an item.

BACKGROUND

Online marketplaces include many sellers listing items for sale. Buyers buy these items and sellers ship the items to the buyer upon receipt of payment. The shipping process typically includes the seller packing the item in a box, sealing it up, bringing it to the post office, filling out the necessary forms, weighing it to calculate the postage, paying for the postage, affixing the stamp on the box, and finally dropping the box in the parcel deposit area. Because this inefficient shipping process entails many steps, it becomes a deterrent for sellers to list, sell, and ship their items.

BRIEF DESCRIPTION OF THE DRAWINGS

The present disclosure is illustrated by way of example, and not by way of limitation, in the figures of the accompanying drawings in which.

DETAILED DESCRIPTION

Although the present disclosure has been described with reference to specific example embodiments, it will be evident that various modifications and changes may be made to these embodiments without departing from the broader scope of the disclosure. Accordingly, the specification and drawings are to be regarded in an illustrative rather than a restrictive sense.

A system and method for dropping off an item at a kiosk are described. The kiosk includes a computer processor, an input device, a display device, and a plurality of compartments for receiving items for sale. A compartment in the kiosk is identified based at least on the size of the item and perhaps other characteristics of the item. A lock code and an unlock code for the compartment in the kiosk are generated. The compartment becomes locked in response to receiving the lock code at the kiosk and opens in response to receiving the unlock code at the kiosk. The lock code and an identification of the compartment are communicated to the seller of the item. The unlock code is communicated to the seller of the item when the item fails to sell within a certain time period. The unlock code, identification of the compartment, and geographic location of the kiosk are transmitted to a purchaser of the item or an agent of the kiosk-owner/operator when the item is sold to the purchaser.

System Architecture

Figure 1:
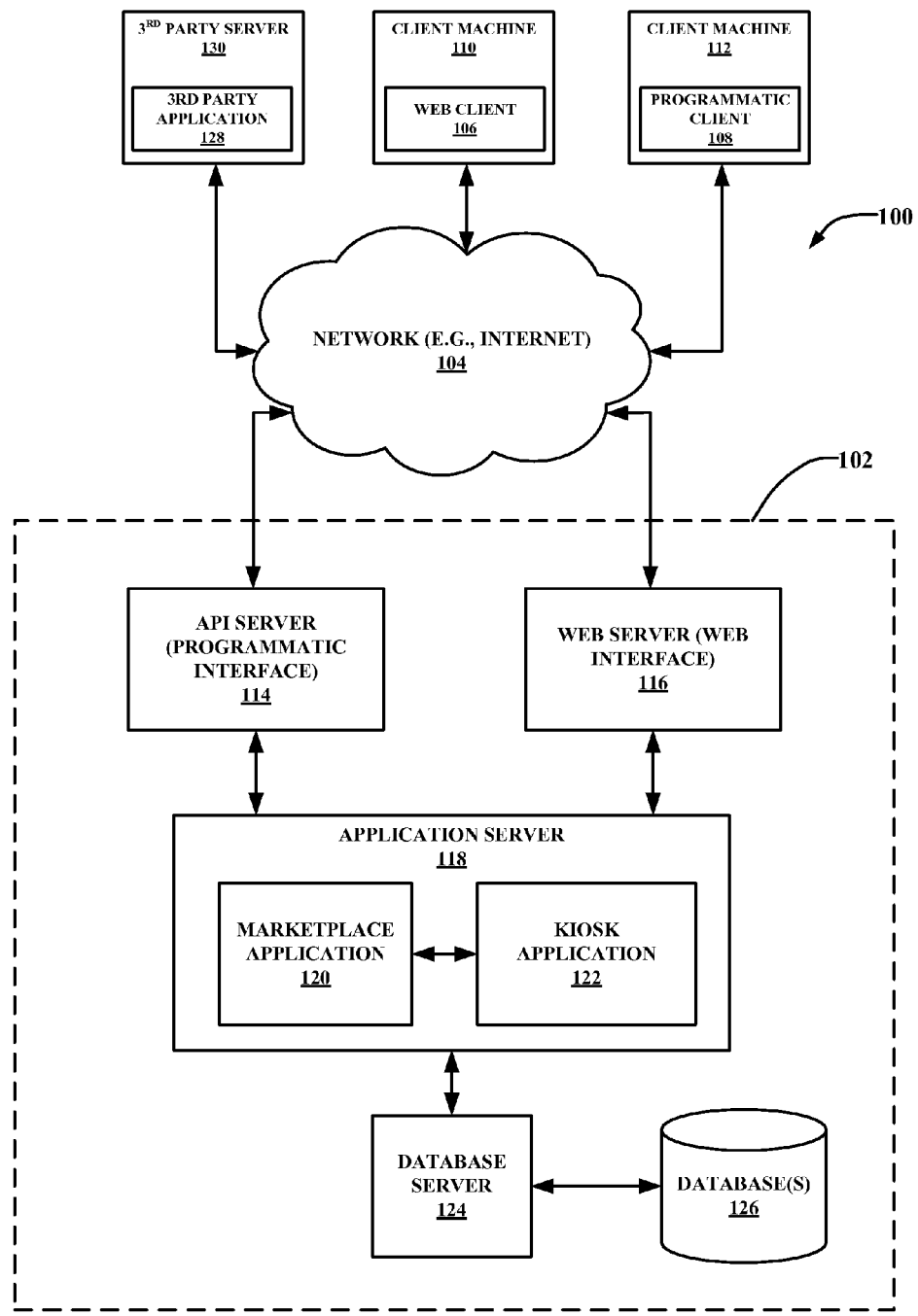
FIG. 1 is a network diagram depicting a network system having a client-server architecture configured for exchanging data over a network, according to one embodiment.

FIG. 1 is a network diagram depicting a network system 100 having a client-server architecture configured for exchanging data over a network, according to one embodiment. For example, the network system 100 may be a publication/publisher system where clients may communicate and exchange data within the network system 100. The data may pertain to various functions (e.g., online item purchases) and aspects (e.g., managing content and user reputation values) associated with the network system 100 and its users. Although illustrated herein as a client-server architecture, other embodiments may include other network architectures, such as peer-to-peer or distributed network environments.

A data exchange platform, in an example form of a marketplace application 120 and a kiosk application 122, may provide server-side functionality, via a network 104 (e.g., the Internet) to one or more clients. The one or more clients may include users that utilize the network system 100 and, more specifically, the marketplace application 120 and the kiosk application 122, to exchange data over the network 104. These transactions may include transmitting, receiving (communicating), and processing data to, from, and regarding content and users of the network system 100. The data may include, but is not limited to, content and user data such as user profiles; user attributes; product and service reviews and information, such as pricing and descriptive information; product, service, manufacturer, and vendor recommendations and identifiers; product and service listings associated with buyers and sellers; auction bids; and transaction data, such as collection and payment, shipping transactions, shipping label purchases, and real time synchronization of financial journals, among others.

In various embodiments, the data exchanges within the network system 100 may be dependent upon user-selected functions available through one or more client or user interfaces (UIs). The UIs may be associated with a client machine, such as a client machine 110 using a web client 106. The web client 106 may be in communication with the marketplace application 120 via a web server 116. The UIs may also be associated with a client machine 112 using a programmatic client 108, such as a client application, or a third party server 130 with a third party application 128. It can be appreciated that in various embodiments, the client machines 110, 112, or third party server 130 may be associated with a buyer, a seller, a third party electronic commerce platform, a payment service provider, a shipping service provider, or a financial institution system, each in communication with the networked system 102 and optionally each other. The buyers and sellers may be any one of individuals, merchants, or service providers.

Turning specifically to the marketplace application 120 and the kiosk application 122, an application program interface (API) server 114 and a web server 116 are coupled to, and provide programmatic and web interfaces respectively to, one or more application servers 118. The application server 118 hosts one or more marketplace applications 120 and one or more kiosk applications 122. The application server 118 is, in turn, shown to be coupled to one or more database servers 124 that facilitate access to one or more databases 126.

In one embodiment, the web server 116 and the API server 114 communicate and receive data pertaining to listings and transactions, among other things, via various user input tools. For example, the web server 116 may send and receive data to and from a toolbar or webpage on a browser application (e.g., web client 106) operating on a client machine (e.g., client machine 110). The API server 114 may send and receive data to and from an application (e.g., programmatic client 108 or third party application 128) running on another client machine (e.g., client machine 112 or $3^{rd}$ party server 130).

In one embodiment, the marketplace application 120 provides listings and price-setting mechanisms whereby a user may be a seller or buyer who lists or buys goods and/or services (e.g., for sale) published on the marketplace application 120.

In one embodiment, the kiosk application 122 includes a system and a method for identifying a compartment in the kiosk, and generating a code to lock and a code to unlock to a seller of the marketplace application 120. The location and size of the compartment may be based on the size of the item sold from the seller and the geographic location of the seller. In one embodiment, the kiosk application 122 includes a system and a method for generating a shipping label for a shipping carrier, and for communicating the code to unlock to the shipping carrier corresponding to the shipping label. The shipping carrier accesses the item in the compartment using the code to unlock and packages the item if the item is not disposed in a shipping package. The shipping label is then affixed to the shipping package. The shipping carrier ships the item to the buyer identified in the shipping label.

Figure 2:
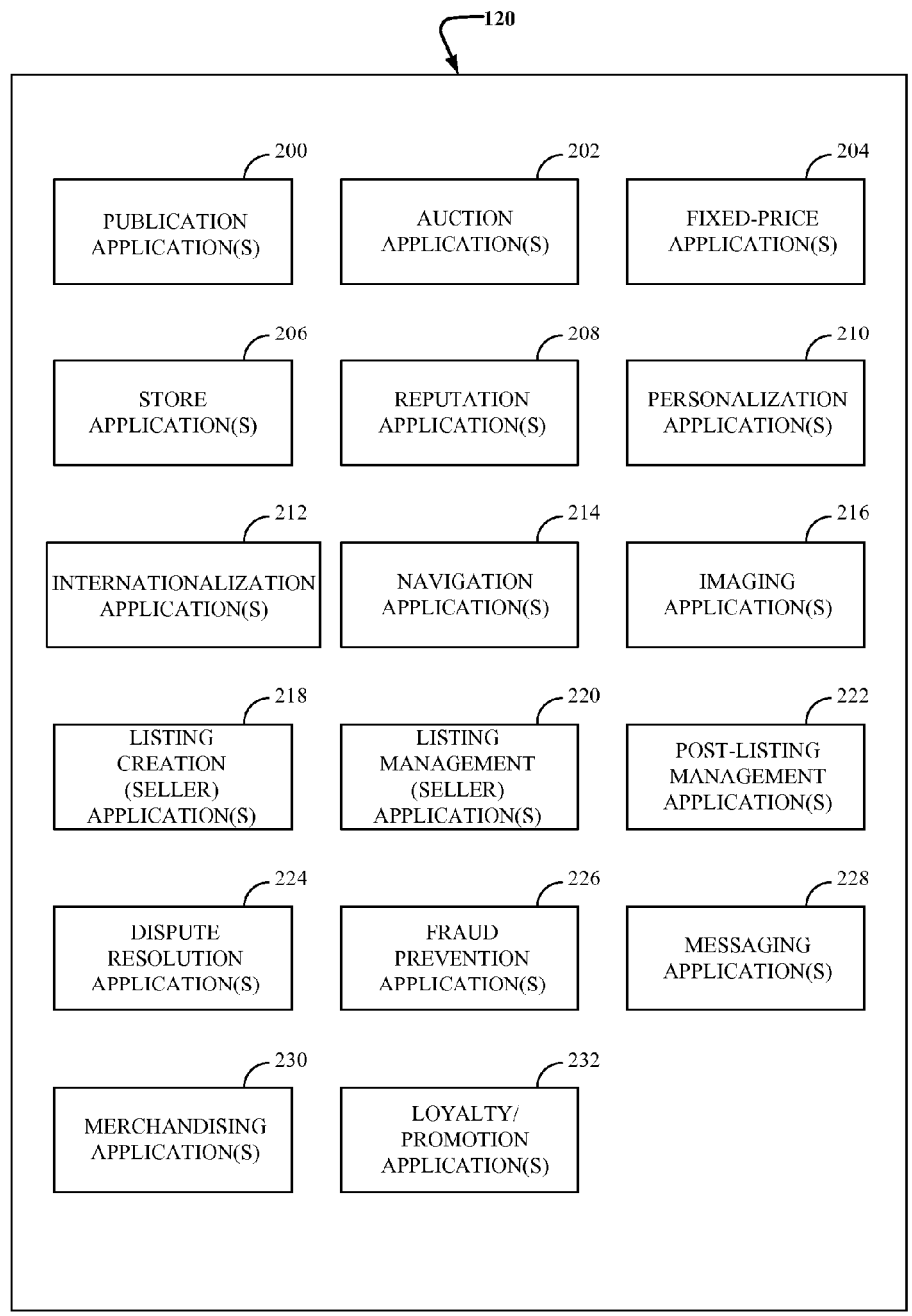
FIG. 2 shows a block diagram illustrating one example embodiment of a marketplace application.

FIG. 2 shows a block diagram illustrating one example embodiment of the marketplace application 120. The marketplace application 120 may be hosted on dedicated or shared server machines (not shown) that are communicatively coupled to enable communications between server machines. The marketplace application 120 and the kiosk application 122 themselves are communicatively coupled (e.g., via appropriate interfaces) to each other and to various data sources, so as to allow information to be passed between the marketplace application 120 and the kiosk application 122 or so as to allow the marketplace application 120 and the kiosk application 122 to share and access common data. The marketplace application 120 and the kiosk application 122 may, furthermore, access one or more databases 126 via the database servers 124.

The networked system 102 may provide a number of publishing, listing, and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace application 120 is shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. For example, consider that where the networked system 102 supports person-to-person trading, users may have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page in which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the marketplace application 120 and the kiosk application 122 may include one or more imaging applications 216, which users may utilize to upload images for inclusion within the listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and may be offered a reward for which accumulated loyalty points can be redeemed.

Figure 3:
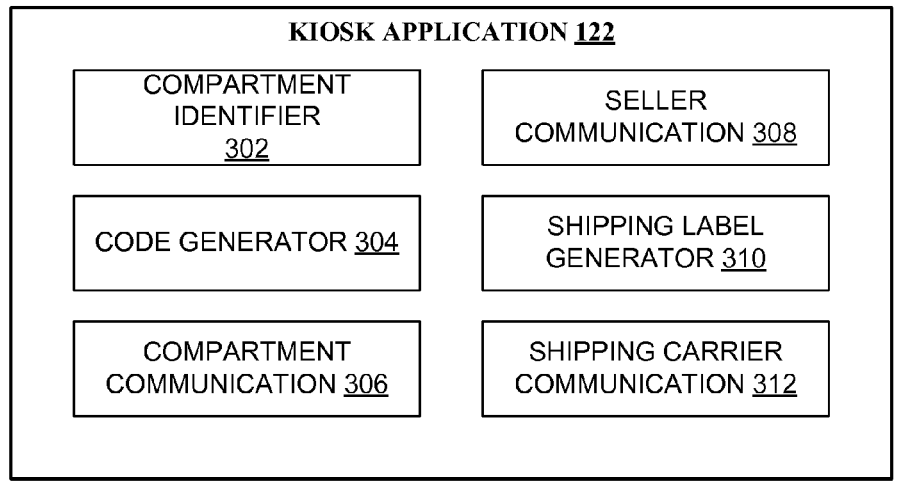
FIG. 3 shows a block diagram illustrating one example embodiment of a kiosk application.

FIG. 3 shows a block diagram illustrating one example embodiment of the kiosk application 122. The kiosk application 122 may include a compartment identifier module 302, a code generator module 304, a compartment communication module 306, a seller communication module 308, a shipping label generator module 310, and a shipping carrier communication module 312.

The compartment identifier module 302 identifies a compartment based on an item (e.g., physical dimensions or size of the item, value of the item). In an embodiment, the seller enters data about the item at an input device at the kiosk, and the compartment identifier module 302 identifies an appropriate compartment for the item. If the seller does not provide a physical size and/or weight of the item, the compartment identifier module 302 can be configured to determine the size and hence appropriate compartment for the item. For example, if the seller indicates that he or she would like to sell a mobile device, the compartment identifier module 302 can intelligently determine an appropriate compartment of smaller size for the mobile device. In another embodiment, the compartment identifier module 302 identifies a compartment based on other factors such as compartment availability, the ranking or reputation of the seller in the marketplace application 120, the time of listing from the seller, and whether the seller has requested a special sized compartment.

In another example, the compartment identifier module 302 identifies the physical dimensions of the item based on an identification of the item from the seller. The compartment identifier module 302 then determines available lockers with sizes large enough to fit the item based on the physical dimensions of the item.

In another example, the compartment identifier module 302 may request, from the seller, the physical dimensions of the item or the physical dimensions of a package used to ship the item. The compartment identifier module 302 then determines available compartments with sizes large enough to fit the item based on the physical dimensions of the item or based on the physical dimensions of the package.

The code generator module 304 generates a lock code and an unlock code for the compartment identified by the compartment identifier module 302. The compartment may close or become locked in response to receiving the lock code. The compartment may open or become unlocked in response to receiving the unlock code.

In one embodiment, the compartment receives the lock code and the unlock codes via a keypad located near the compartment. The seller may input the lock code using the keypad located near the compartment. In another embodiment, the compartment may receive the lock code remotely from a mobile device of the seller. For example, the seller may activate the lock code on his or her mobile device when in proximity to the compartment or kiosk. The mobile device may communicate indirectly with the compartment activate the locking via a computer network (e.g., Internet). For example, the mobile device of the seller may communicate the lock code (e.g., that is unique to every compartment and valid for a one time usage) to a server in communication with the compartment. After the server validates the lock code from the mobile device, the server instructs the compartment to lock accordingly. In another embodiment, the mobile device of the seller may communicate directly with the compartment via infrared, Wi-Fi, Bluetooth, NFC, or any other wireless means and send the lock code directly to the compartment.

Similarly, a delivery person from a shipping carrier may manually enter the unlock code on the keypad of the kiosk or compartment to unlock the compartment and access the item. The delivery person may, similarly, use a communication device to communicate the unlock code directly or indirectly to the kiosk to unlock the compartment.

In one embodiment, the code generator module 304 generates lock codes and unlock codes that are unique and expire within a predefined amount of time from the time they are generated. For example, a lock code, if not used within a day, may become void and can no longer be used to lock a compartment.

In another embodiment, the code generator module 304 may access a unique identifier to the seller. The unique identifier may be used to lock and unlock the compartment. The unique identifier includes a random token generated by the code generator module 304 or may be based on biometric features of the seller, and unique information of the seller such as the seller's driver's license number or social security number.

The compartment communication module 306 may communicate the unique identifier or unique information to the compartment (corresponding to the compartment identified by the compartment identifier module 302) so that when the compartment receives the unique identifier, the compartment operates to be locked or unlocked accordingly (e.g., doors may open or close automatically, a lock on the corresponding compartment door may be activated or deactivated). In one embodiment, the compartment communication module 306 sends locking data (e.g., lock code, unlock code, seller information, shipping carrier information, among others). For example, the compartment communication module 306 may send information data from the driver's license of the seller or a credit card of the seller. The seller may only have to swipe his driver's license or credit card at a device connected to the compartment to lock or unlock it without having to enter any code on any keypad of the compartment.

The compartment communication module 306 may receive status data regarding a status of the compartment. For example, the status data may indicate whether the compartment is opened or closed, whether a sensor inside the compartment detects an item inside it, whether a compartment is activated or deactivated, the time and date the compartment was activated, the time and date the compartment was locked or unlocked, the information received at the compartment (e.g, code entered, magnetic bar code from an ID or a credit card). In one embodiment, the compartment communication module 306 receives the lock or unlock code from the compartment and determines the validity of the lock or unlock code. In another embodiment, the validation of the lock code or unlock code is performed at the kiosk or compartment instead of at the kiosk application 122. For example, the compartment communication module 306 does not receive the lock or unlock code from the compartment, but only receives an indication of whether the compartment has been opened or closed.

The seller communication module 308 communicates the information of the compartment to the seller in response to the seller requesting to drop off an item for sale at the kiosk. For example, the information may include an identification of the compartment (e.g., compartment A2), and a lock code to lock the compartment (or an unlock code to open the compartment door).

In another embodiment, the seller communication module 308 receives information of the item from the seller. For example, the information may include an identification of the item (e.g., digital player brand x model y), the physical dimensions of the item (e.g., size of the actual item or package containing the item), value of the item (e.g., sell price), and so forth.

The shipping label generator 310 may generate a shipping label for a shipping carrier based on the size and weight of the item, the address of the buyer, the type of shipping service selected by the seller (e.g., overnight, express, saver, ground), the value of the item, and whether the item is insured for shipping. The shipping label generator 310 may communicate with a shipping carrier server (not shown) to generate the shipping label and a tracking number.

The shipping carrier communication module 312 communicates the information of the kiosk and compartment to the shipping carrier. For example, the information may include the geographic location of the kiosk (e.g., store ABC at 123 Main St.), an identification of the compartment (e.g., compartment A2), and an unlock code to unlock the corresponding compartment.

The shipping carrier communication module 312 may also receive information from the shipping label generator module 310 to generate the shipping label. The shipping carrier may then affix the shipping label to the item from the compartment. In another embodiment, the shipping carrier communication module 312 may receive the shipping label from the shipping carrier communication module 312 and affix the label to the item from the compartment.

In another embodiment, the shipping carrier communication module 312 may also receive information of the item. The shipping carrier may identify a box that is large enough to accommodate the item.

Figure 4:
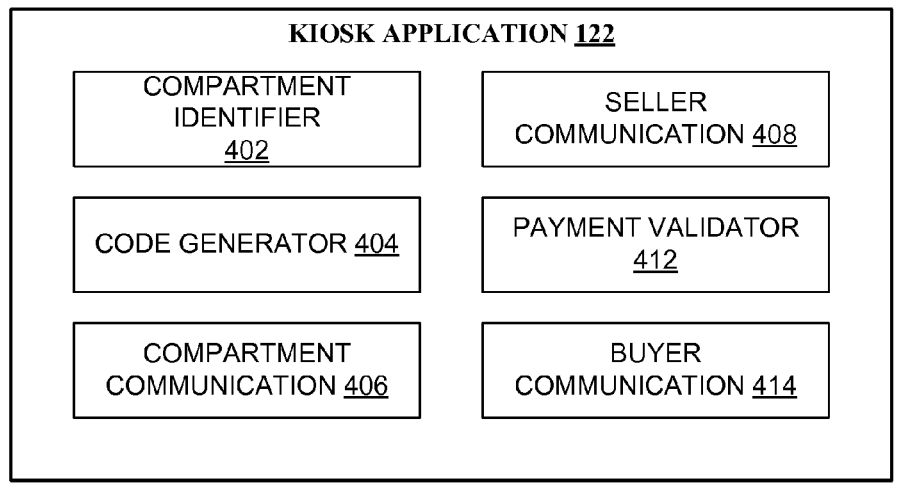
FIG. 4 shows a block diagram illustrating another example embodiment of a kiosk application.

FIG. 4 shows a block diagram illustrating another example embodiment of the kiosk application 122. The kiosk application 122 may include a compartment identifier module 402, a code generator module 404, a compartment communication module 406, a seller communication module 408, a local transaction module 410, a payment validator module 412, and a buyer communication module 414.

The code generator module 404 may operate similarly to the code generator module 304 of FIG. 3. The compartment communication module 406 may operate similarly to the locker communication module 306. The seller communication module 408 may operate similarly to seller communication module 308.

The payment validator module 412 may verify that the online marketplace has received and processed a payment from the buyer. Upon validation of the payment, the buyer communication module 414 sends information of the kiosk and compartment to the buyer. For example, the information may include the geographic location of the kiosk (e.g., store ABC at 123 Main St.), an identification of the compartment (e.g., compartment A2), and an unlock code to unlock the corresponding compartment.

Figure 5:
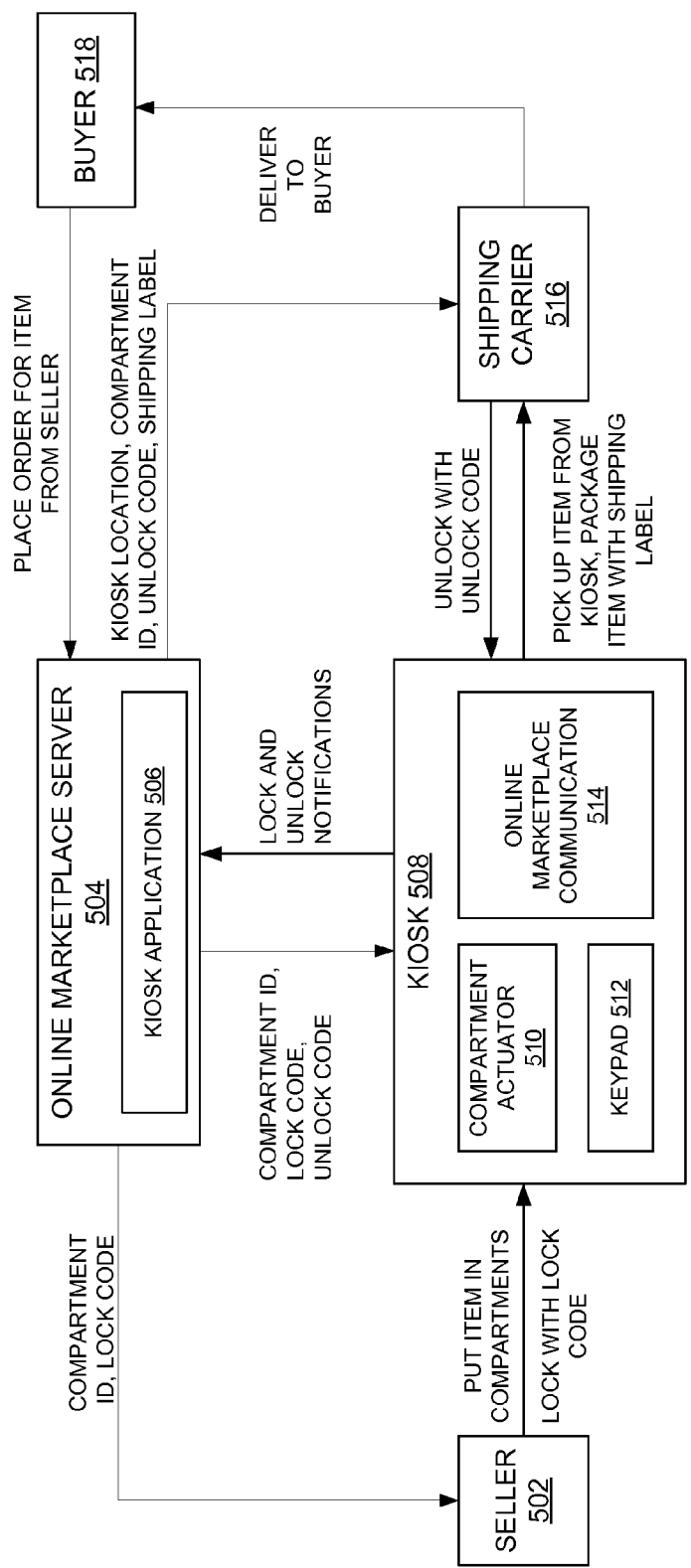
FIG. 5 shows a block diagram illustrating one example embodiment of an operation of a kiosk system to ship an item.

FIG. 5 shows a block diagram illustrating one example embodiment of an operation of a kiosk system to ship an item. A seller 502 may list an item for sale with the online marketplace server 504. The seller 502 may communicate information about the item (e.g., model, size, weight) to the online marketplace server 504. The online marketplace server 504 may receive an order for the item from a buyer 518.

The kiosk application 506 of the online marketplace server 504 identifies the item and, if needed, determines a shipping carrier to process the shipping of the item. In one embodiment, the kiosk application 506 generates a compartment identifier, a lock code, and an unlock code. The compartment identifier may include a geographic location of the kiosk (for the shipper's and buyer's benefit) and an identification of the compartment.

The kiosk application 506 communicates the compartment identifier, the lock code, and the unlock code to the kiosk 508. In one embodiment, the kiosk application 506 communicates a compartment identifier and a lock code to the seller 502. The lock code allows the seller 502 to lock the item in the corresponding compartment.

In one embodiment, the kiosk 508 includes a compartment actuator 510, a keypad 512, and an online marketplace communication module 514. The seller 502 puts the item in the corresponding compartment 508 and enters the lock code into the keypad 512 of the kiosk 508. In response to the lock code, the compartment actuator 510 locks a door of the kiosk 508. The online marketplace communication module 514 may be configured to communicate with the kiosk application 506. For example, the online marketplace communication module 514 receives the lock code, the unlock code, and an identification of the kiosk 508. In one embodiment, the online marketplace communication module 514 notifies the kiosk application 506 of the status of the compartment actuator 510. For example, the online marketplace communication module 514 may notify the kiosk application 506 of the time and date when the compartment 508 has been locked and unlocked.

The kiosk application 506 also communicates the location of the kiosk 508, the compartment identifier, the unlock code, and item information to the corresponding shipping carrier 516. A carrier from the shipping carrier 516 may retrieve the item from the compartment 508 by entering the unlock code into the keypad 512 from the corresponding kiosk 508. In one embodiment, the shipping carrier 516 packages the item with a container having a size based on the item information.

In one embodiment, the kiosk application 506 also generates a shipping label for the shipping carrier 516. The shipping carrier 516 may affix the shipping label, received from the kiosk application 506, to the container.

The shipping carrier 516 may process and deliver the package or container to the buyer 518 according to the shipping service specified on the shipping label.

Figure 6:
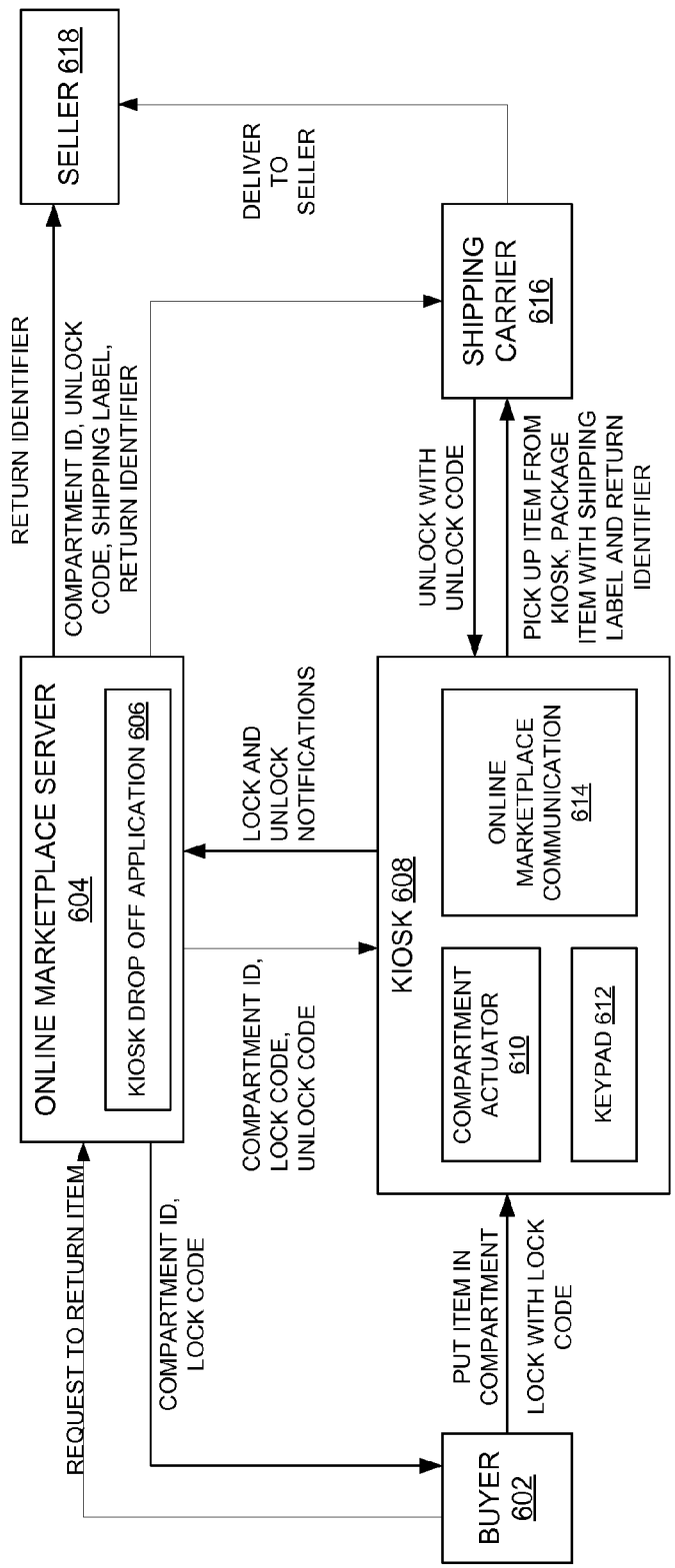
FIG. 6 shows a block diagram illustrating one example embodiment of an operation of a kiosk system to return an item.

FIG. 6 shows a block diagram illustrating one example embodiment of an operation of a kiosk system to return an item. The buyer 602 may submit a request to the online marketplace server 604 to return an item that was sold by a seller 618 on the online marketplace server 604. The kiosk application 606 may identify an available kiosk 608 that is geographically in proximity to the address of the buyer 602. The kiosk 608 may include a compartment actuator 610, a keypad 612, and an online marketplace communication module 614. The kiosk application 606 may communicate a location of the kiosk 608, a compartment identifier, and a lock code.

The buyer 602 puts the item in the corresponding compartment 608 and locks it in the compartment 608 with the lock code provided from the kiosk application 606. In one embodiment, the buyer 602 enters the lock code on the keypad 612. In response to validating the lock code, the compartment actuator 610 locks the compartment of the kiosk 608. The online marketplace communication module 614 may generate a notification to the kiosk application 606 that the compartment of the kiosk 608 has been locked.

The shipping carrier 616 receives a shipping label, a location of the kiosk 608, an unlock code, and a return identifier. The kiosk applications 606 also communicate the return identifier to the seller 618. The shipping carrier 616 may unlock the compartment of the kiosk 608 by entering the unlock code on the keypad 612. The shipping carrier 616 then picks up the item from the compartment of the kiosk 608 and packages the item with the shipping label and return identifier received from the kiosk application 606. The shipping carrier 616 then processes the shipping and delivers the item to the seller 618.

Figure 7:
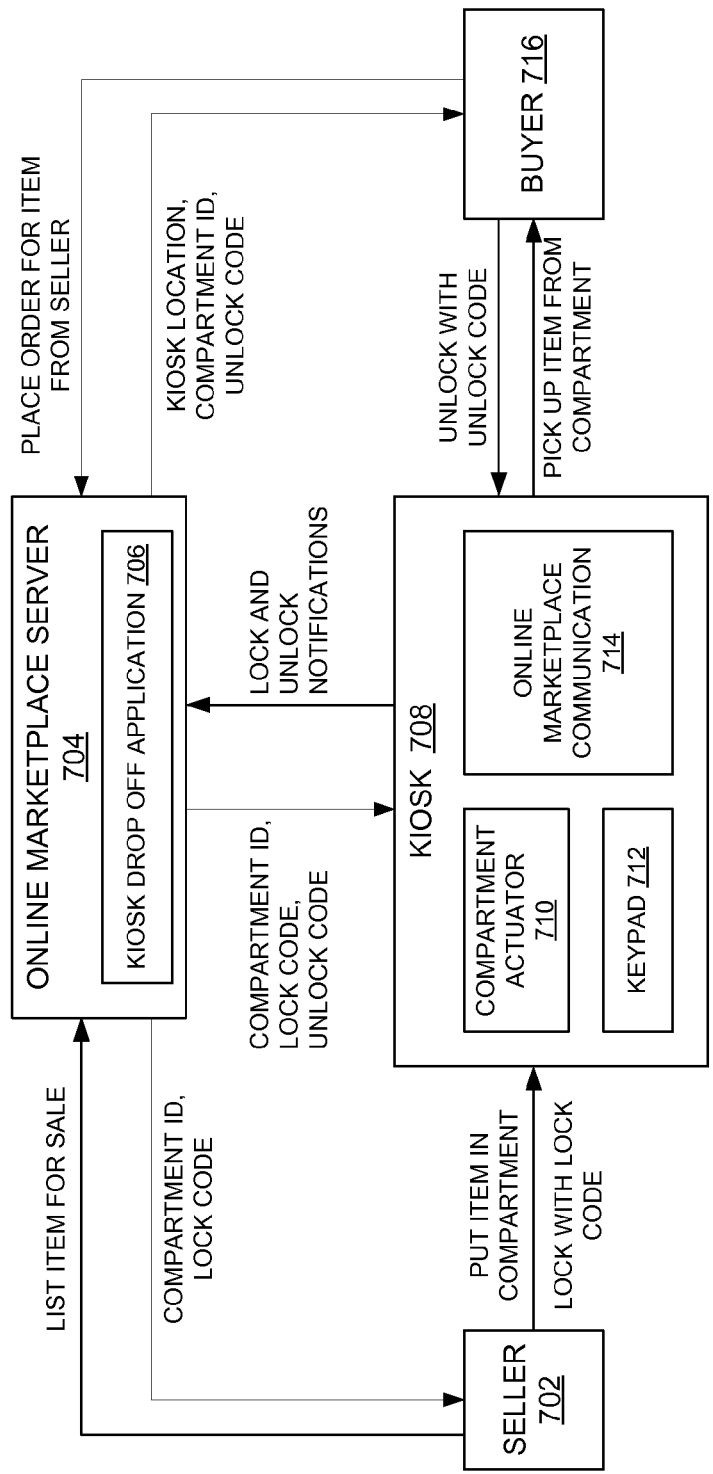
FIG. 7 shows a block diagram illustrating one example embodiment of an operation of a kiosk system to drop off an item for a local buyer.

FIG. 7 shows a block diagram illustrating one example embodiment of an operation of a kiosk system when the buyer is a local buyer. A seller 702 may list an item for sale on the online marketplace server 704. The online marketplace server 704 also receives an order for the same item from a buyer 716.

The kiosk application 706 determines the distance between the seller 702 and the buyer 716. If the distance between the seller 702 and the buyer 716 is less than a threshold distance, the kiosk application 706 may determine that the transaction between the buyer 716 and the seller 702 is a local transaction. The kiosk application 706 then determines that the kiosk 708 is in the same general locale as the buyer.

The kiosk 708 may include a compartment actuator 710, a keypad 712, and an online marketplace communication 714 module. The seller 702 receives information about the kiosk 708. The information may include a compartment identifier and a lock code. The seller 702 may put the item in the identified compartment of the kiosk 708 without any packaging material and secure a door of the compartment using the lock code. The online marketplace communication module 714 may notify the kiosk application 706 of the status of the compartment of the kiosk 708 (e.g., closed and locked, closed and unlocked, opened and unlocked, opened and locked).

The kiosk application 706 may communicate a location of the kiosk 708, the compartment identifier, and the unlock code to the buyer 716. The buyer 716 may retrieve the item from the compartment of the kiosk 708 using the unlock code provided by the kiosk application 706.

Figure 8:
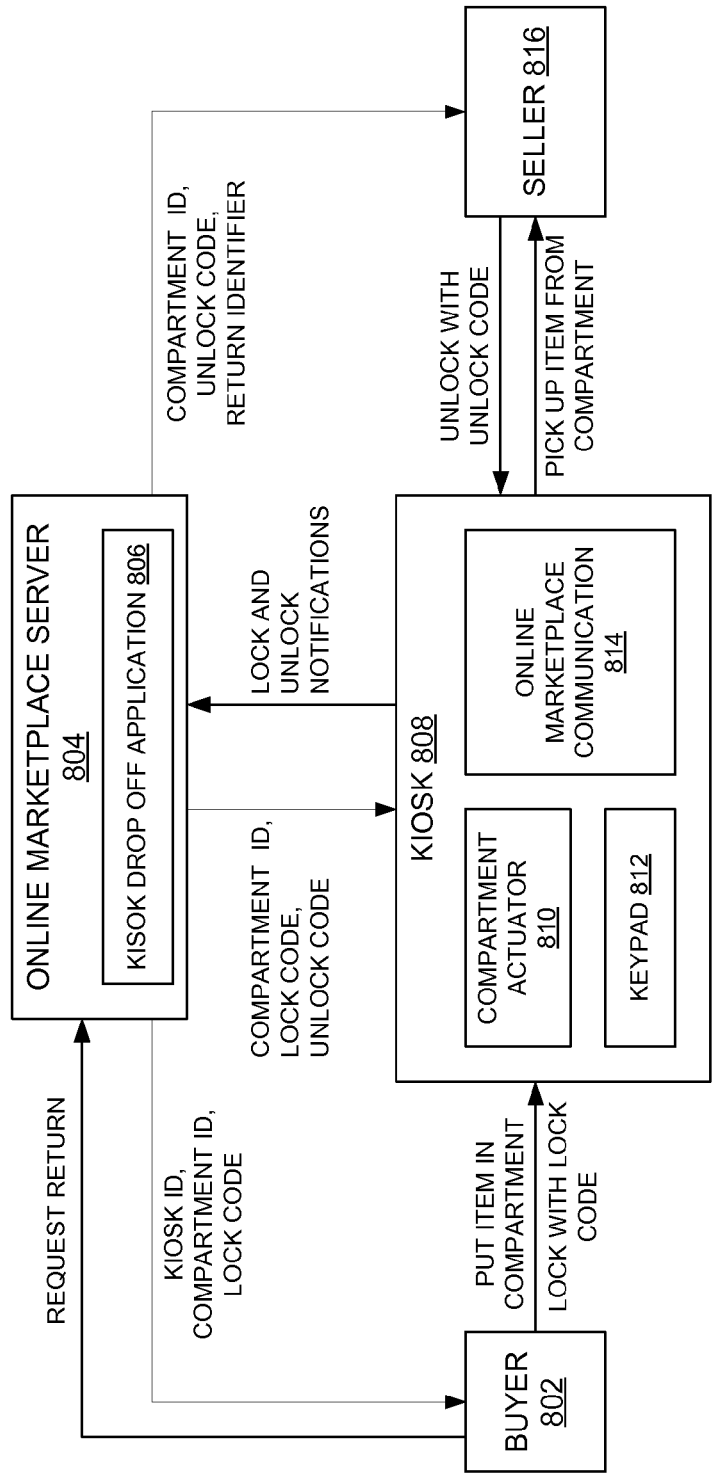
FIG. 8 shows a block diagram illustrating one example embodiment of an operation of a kiosk system to return an item from a local buyer.

FIG. 8 shows a block diagram illustrating one example embodiment of an operation of a kiosk system to return an item from a local buyer. A buyer 802 may submit a request to an online marketplace server 804 to return an item back to a seller 816.

The kiosk application 806 may determine that the transaction between the seller 816 and the buyer 802 is a local transaction. For example, if the distance between the seller 816 and the buyer 802 is less than a threshold distance, the kiosk application 806 may determine that the transaction between the buyer 802 and the seller 816 is a local transaction. The kiosk application 806 identifies the kiosk that the seller 816 originally used as the kiosk 808 that will be used by the buyer 802.

The kiosk 808 may include a compartment actuator 810, a keypad 812, and an online marketplace communication module 814. The buyer 802 receives information about the kiosk 808. The information may include a geographic location of the kiosk 808, a compartment identifier, and a lock code. The buyer 802 may put the item in a compartment of the kiosk 808 without any packaging material and secure a door of the compartment of the kiosk 808 using the lock code. The online marketplace communication module 814 may notify the kiosk application 806 of the status of the compartment of the kiosk 808 (e.g., closed and locked, closed and unlocked, opened and unlocked, opened and locked).

The kiosk application 806 may communicate the locker identifier, the unlock code, and a return identifier to the seller

816. The seller 816 may retrieve the item from the compartment of the kiosk 808 using the unlock code provided by the kiosk application 806.

Figure 9:
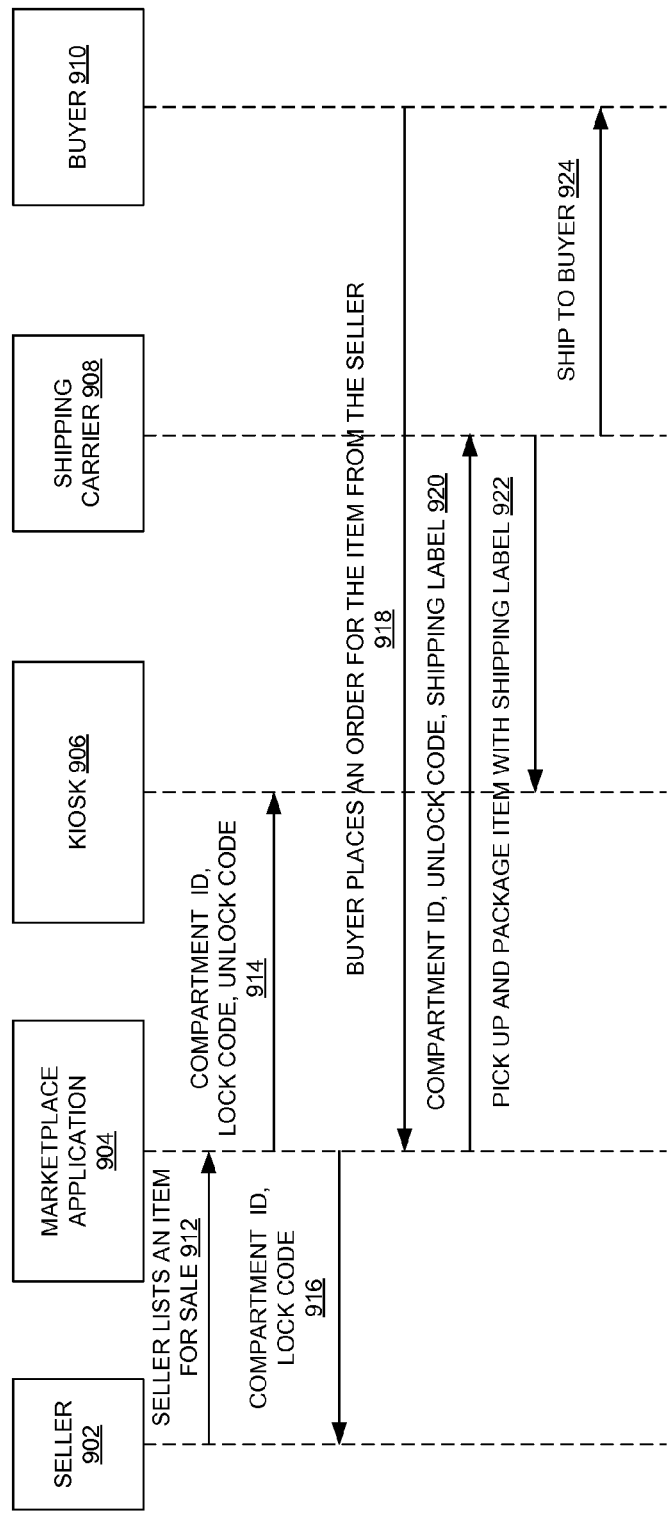
FIG. 9 shows a ladder diagram illustrating one example embodiment of an operation of a kiosk system.

FIG. 9 shows a ladder diagram illustrating one example embodiment of an operation of a kiosk system. Using a kiosk, or a mobile device that is in communication with a marketplace application and/or kiosk, a seller 902 lists an item for sale at operation 912. At operation 914, the marketplace application 904 identifies a compartment of the kiosk 906. The marketplace application 904 communicates the compartment identifier, a lock code, and an unlock code to the kiosk 906. At operation 916, the marketplace application 904 communicates the compartment identifier and the lock code to the seller 902. At operation 918, a buyer 910 places an order for the item from the seller 902 on the marketplace application 904. At operation 920, the marketplace application 904 communicates the kiosk and compartment identifier, the unlock code, and a shipping label to the corresponding shipping carrier 908. At operation 922, the shipping carrier 908 picks up the item from the kiosk 906 and packages the item with the shipping label received from the marketplace application 904. In one embodiment, the shipping carrier 908 may notify the marketplace application 904 that the item has been picked up. In another embodiment, the kiosk 906 may notify the marketplace application 904 that the item has been picked up by the shipping carrier 908. At operation 924, the shipping carrier 908 processes the package according to the shipping service specified on the shipping label and ships the package to the buyer 910.

Figure 10:
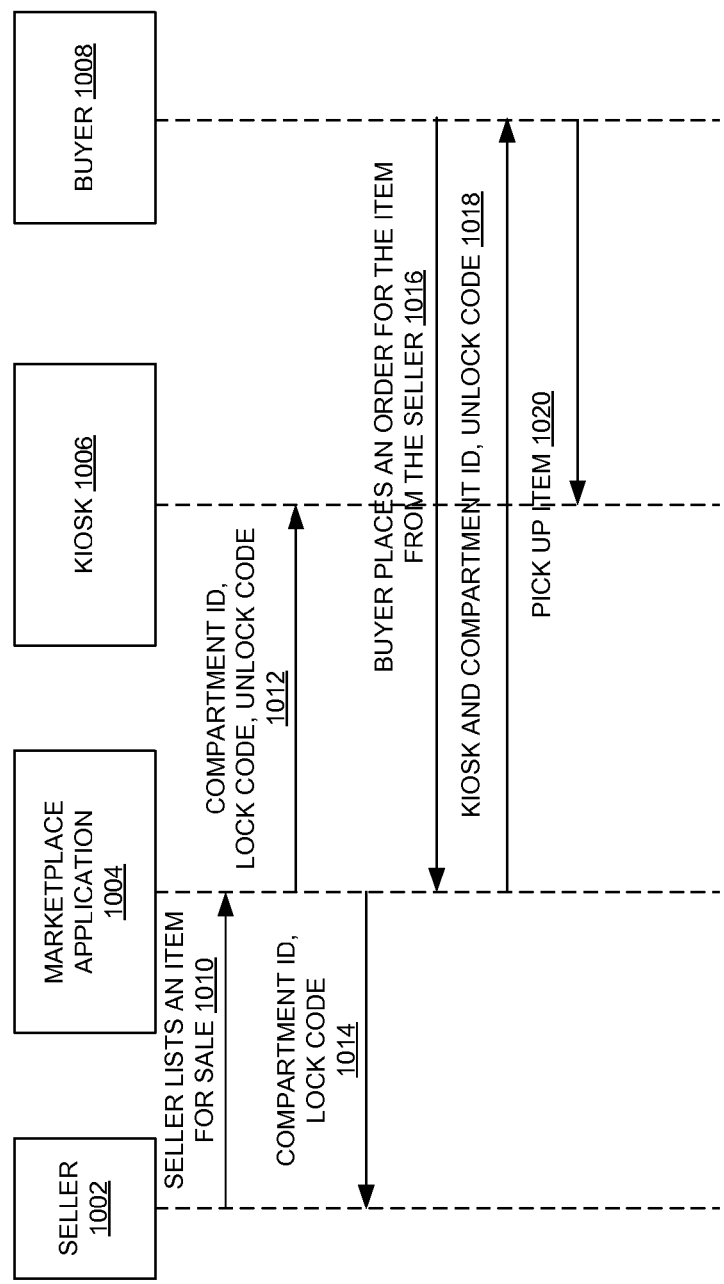
FIG. 10 shows a ladder diagram illustrating one example embodiment of an operation of a kiosk system for a local buyer.

FIG. 10 shows a ladder diagram illustrating one example embodiment of an operation of a kiosk system for a local buyer. At operation 1010, a seller 1002 lists an item for sale using a marketplace application 1004 and/or kiosk 1006. At operation 1012, the marketplace application 1004 identifies a compartment of the kiosk 1006 and generates a compartment identifier, a lock code, and an unlock code. In one embodiment, the marketplace application 1004 identifies the compartment of the kiosk 1006 after receiving an order from a buyer 1008. In another embodiment, the marketplace application 1004 identifies a compartment of the kiosk 1006 before receiving an order from the buyer 1008.

The marketplace application 1004 may communicate the lock code and unlock code for the corresponding compartment identifier to the locker 1006. At operation 1014, the marketplace application 1004 communicates the compartment identifier and the lock code to the seller 1002. At operation 1016, the marketplace application 1004 receives an order from a buyer 1008 for the item listed by the seller 1002. In one embodiment, upon validation and verification of the payment from the buyer 1008, the marketplace application 1004 communicates the kiosk and compartment identifier and the unlock code at operation 1018. At operation 1020, the buyer 1008 accesses the item from the compartment of the kiosk 1006 using the unlock code and retrieves the item.

Figure 11:
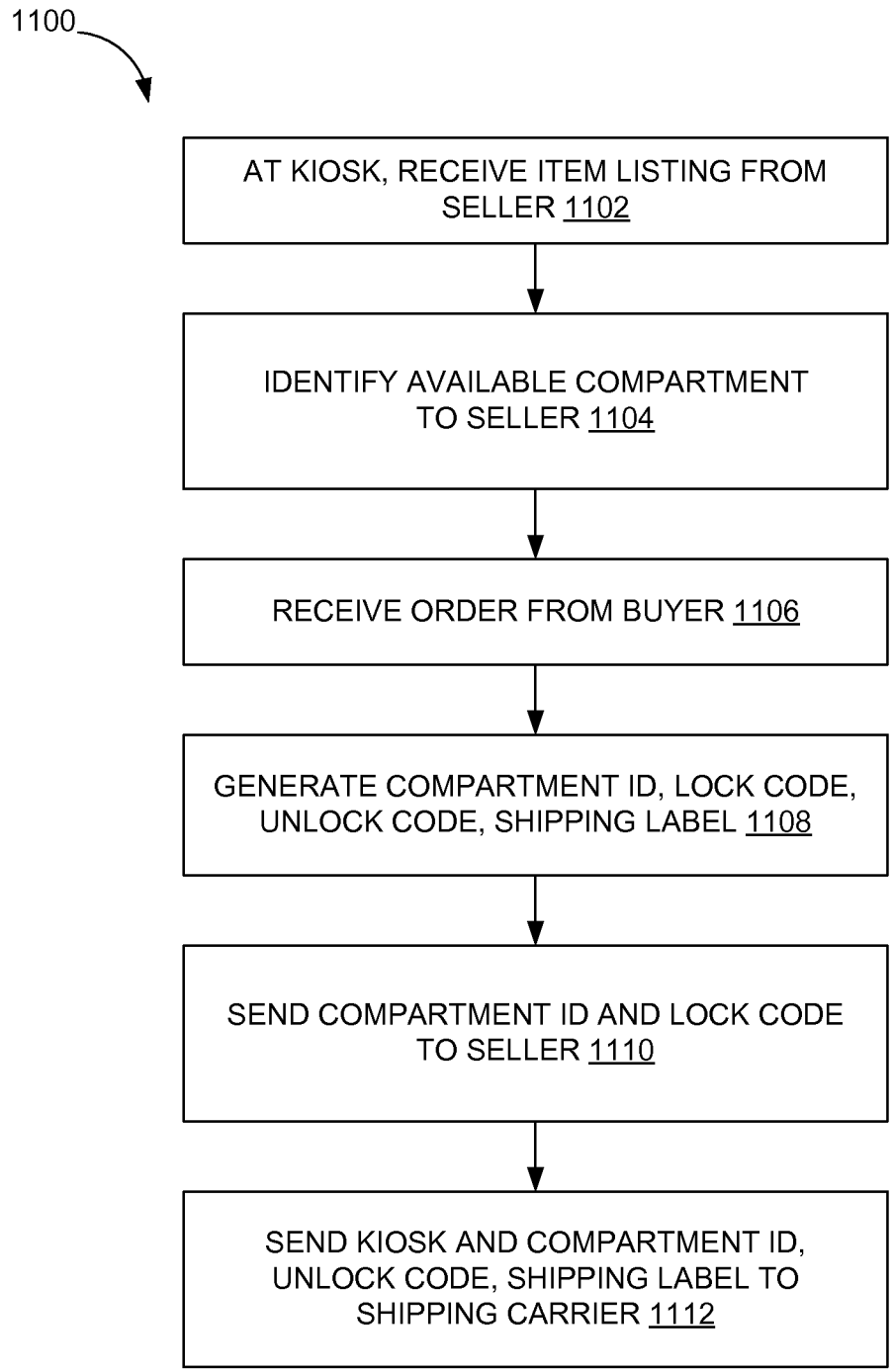
FIG. 11 shows a flow diagram illustrating one example embodiment of a method for operating a kiosk system.

FIG. 11 shows a flow diagram illustrating one example embodiment of a method 1100 for operating a kiosk system. At operation 1102, an item listing is received at a kiosk from a seller. In one embodiment, this operation may be implemented with the marketplace application 120.

At operation 1104, an available compartment in the kiosk is identified. In one embodiment, this operation may be implemented with the compartment identifier module 302 of the kiosk application 122 of FIG. 3.

At operation 1106, an order for the item is received from a buyer. In one embodiment, this operation may be implemented with the marketplace application 120.

At operation 1108, a kiosk and compartment identifier, a lock code, unlock code, and a shipping label corresponding to a shipping carrier are generated. In one embodiment, this operation may be implemented with the code generator module 304 of the kiosk application 122. In another embodiment, this operation may also be implemented with the compartment communication module 306. The compartment communication module 306 may communicate the kiosk and compartment identifier, the lock code, and the unlock code to the locker.

At operation 1110, the kiosk and compartment identifier and the lock code are sent to the seller. In one embodiment, this operation may be implemented with the seller communication module 308.

At operation 1112, the kiosk and compartment identifier, the unlock code, and the shipping label are sent to the corresponding shipping carrier. In one embodiment, this operation may be implemented with the shipping carrier communication module 312.

Figure 12A:
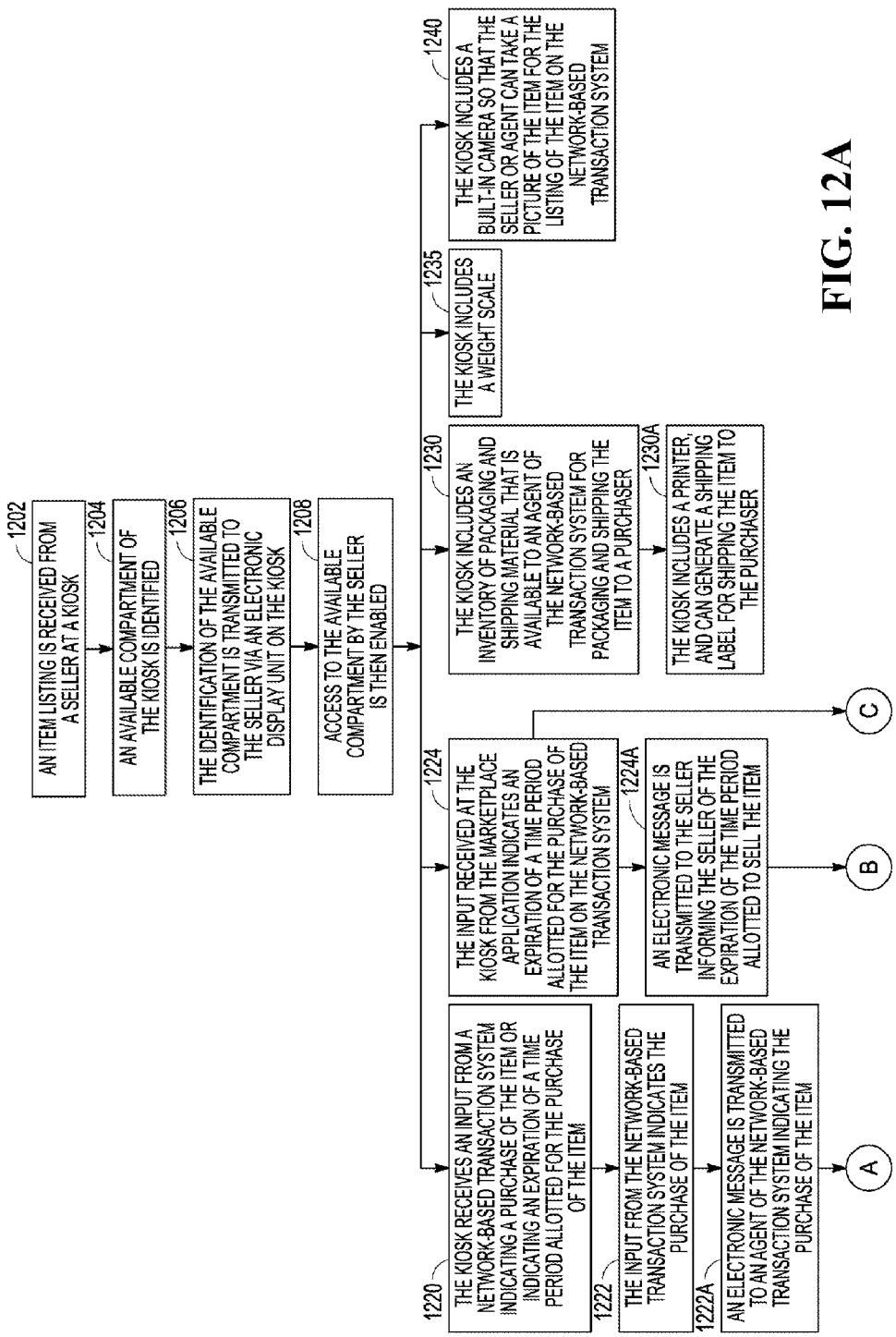
FIGS. 12A and 12B show a flow diagram illustrating another example embodiment of a method for operating a kiosk system.
Figure 12B:
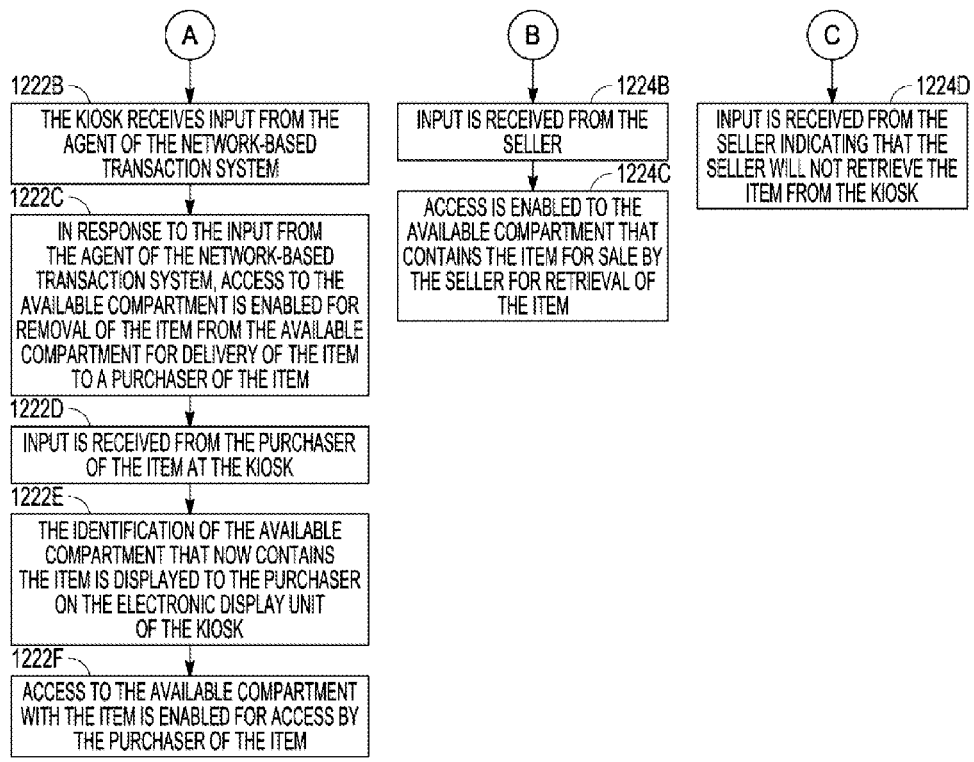

FIGS. 12A and 12B show a flow diagram illustrating one example embodiment of a method 1200 for operating a kiosk system. At operation 1202, an item listing is received from a seller at a kiosk or via a seller's mobile device that is in communication with the kiosk. In one embodiment, this operation may be implemented with the marketplace application 120.

At operation 1204, an available compartment of the kiosk is identified. The available compartment is configured to receive the item for sale. For example, the configuration may relate to the issue of whether the compartment is large enough to receive and hold the item for sale. After the identification of the available compartment, at 1206, the identification of the available compartment is transmitted to the seller via an electronic display unit on the kiosk. In one embodiment, this operation may be implemented with the seller communication module 308. The seller may then operate the compartment identified with the compartment identifier using a lock code that may include a revocable authentication token of the seller. For example, the revocable authentication token may include credentials entered on a touchscreen at the kiosk. The credentials may include an alphanumeric code, a username and password related to the online marketplace, or any other authentication token. In another embodiment, the revocable authentication token may include a wireless identifier of a mobile device of the seller so that the locker can operate the compartment by waving his mobile device in front of the corresponding compartment. The kiosk may then communicate with the kiosk application 122 to verify the identity of the seller and validate the authentication token. The compartment may operate to lock after receiving a validation from the kiosk application 122. At 1208, access to the available compartment by the seller is then enabled. In one embodiment, these operations may be implemented with the compartment identifier module 302 of the kiosk application 122 of FIG. 3.

At 1220, the kiosk receives an input from a network-based transaction system indicating a purchase of the item or indicating an expiration of a time period allotted for the purchase of the item. In one embodiment, this operation may be implemented with the marketplace application 120.

At 1222, the input from the network-based transaction system indicates the purchase of the item. When the input from the network-based transaction system indicates a purchase of the item, the kiosk and/or the marketplace application executes the following. At 1222A, an electronic message is transmitted to an agent of the network-based transaction system indicating the purchase of the item. The agent can be an employee of the network-based transaction system, a contractor of the network-based transaction system, an employee or agent of a shipping and delivery service, and/or a U.S. Postal employee, just to name a few examples. At 1222B, the kiosk receives input from the agent of the network-based transaction system. This input can be received via a touchscreen or a keypad for example. At 1222C, in response to the input from the agent of the network-based transaction system, access to the available compartment is enabled for removal of the item from the available compartment for delivery of the item to a purchaser of the item. This embodiment is best suited when the seller and the buyer are not located in the same locale or geographic area.

Additionally, when the input at 1222 indicates the purchase of the item, the kiosk and/or marketplace application executes the following. At 1222D, input is received from the purchaser of the item at the kiosk. The input can be an unlock code that the marketplace application sent to the buyer after the buyer's purchase of the item. At 1222E, the identification of the available compartment that now contains the item is displayed to the purchaser on the electronic display unit of the kiosk. At 1222F, access to the available compartment with the item is enabled for access by the purchaser of the item. This embodiment is best suited when the seller and buyer are in the same locale or geographic area.

At 1224, the input received at the kiosk from the marketplace application indicates an expiration of a time period allotted for the purchase of the item on the network-based transaction system. In this embodiment, the kiosk and/or the marketplace application transaction system execute the following. At 1224A, an electronic message is transmitted to the seller informing the seller of the expiration of the time period allotted to sell the item. At 1224B, input is received from the seller, and at 1224C, access is enabled to the available compartment that contains the item for sale by the seller for retrieval of the item.

Alternatively, when the input at 1224 indicates an expiration of the time period allotted for purchase of the item on the network-based transaction system, then at 1224D, input is received from the seller indicating that the seller will not retrieve the item from the kiosk. This embodiment allows a seller to "not bother with" the item and abandon the item. The agent of the network-based transaction system can then retrieve the item, and dispose of the item as refuse, via a charitable donation, or some other means. In an embodiment, the seller can be charged a fee for this disposal.

Block 1230 illustrates that the kiosk can include an inventory of packaging and shipping material that is available to an agent of the network-based transaction system for packaging and shipping the item to a purchaser. At 1230A, the kiosk can include a printer, and can generate a shipping label for shipping the item to the purchaser.

Block 1235 illustrates that the kiosk can include a weight scale. The scale can be used by the seller or the agent to weigh the item and determine the cost of shipping of the item.

As noted above, the input at the kiosk from the seller includes a listing of the item. In an embodiment, the listing includes a description of the item and an image of the item. The image of the item is normally a digital photograph of the item. As illustrated at 1240, the kiosk can include a built-in camera so that the seller or agent can take a picture of the item for the listing of the item on the network-based transaction system. The camera can be mounted in proximity to the electronic display unit of the kiosk.

Figure 13:
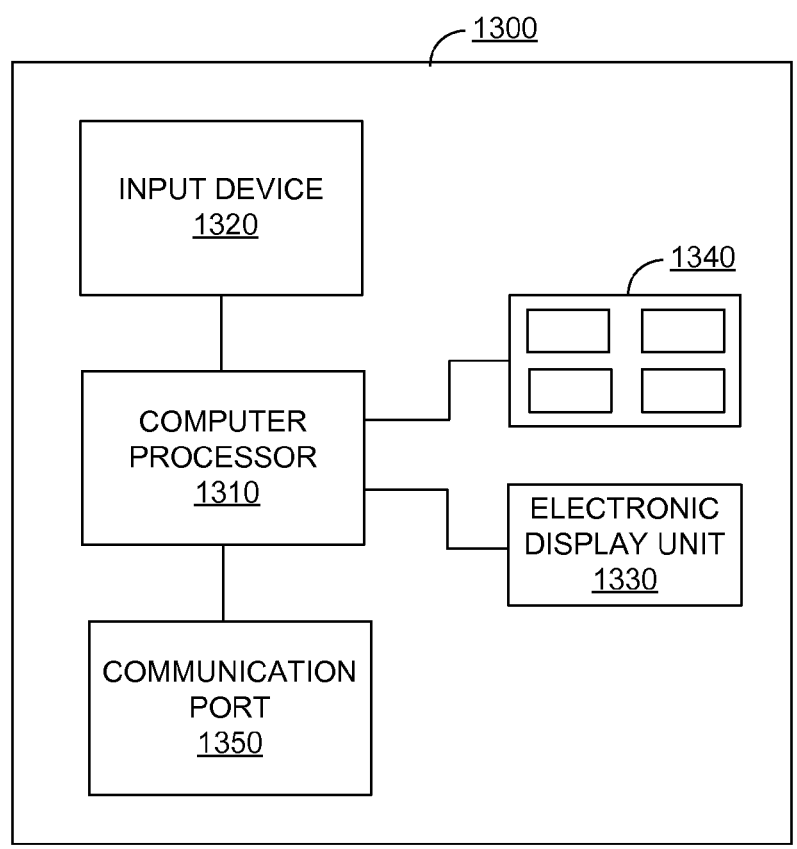
FIG. 13 shows a block diagram illustrating another example embodiment of a kiosk system.

FIG. 13 illustrates a block diagram of another example embodiment of a kiosk 1300 for use in connection with a marketplace application of a network-based transaction system. The kiosk includes a computer processor 1310. The computer processor is communicatively coupled to several kiosk components including an input device 1320, an electronic display unit 1330, a plurality of storage compartments 1340, and a communication port 1350. The input device 1320 can include a keyboard, a keypad, a mouse, a touch screen, a bar code reader, etc. The communication port is configured to couple the computer processor to a data communications network and the marketplace application of the network-based transaction system.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware, may be a design choice. Below, are set out hardware (e.g., machine) and software architectures that may be deployed in various example embodiments.

Example Computer System

Figure 14:
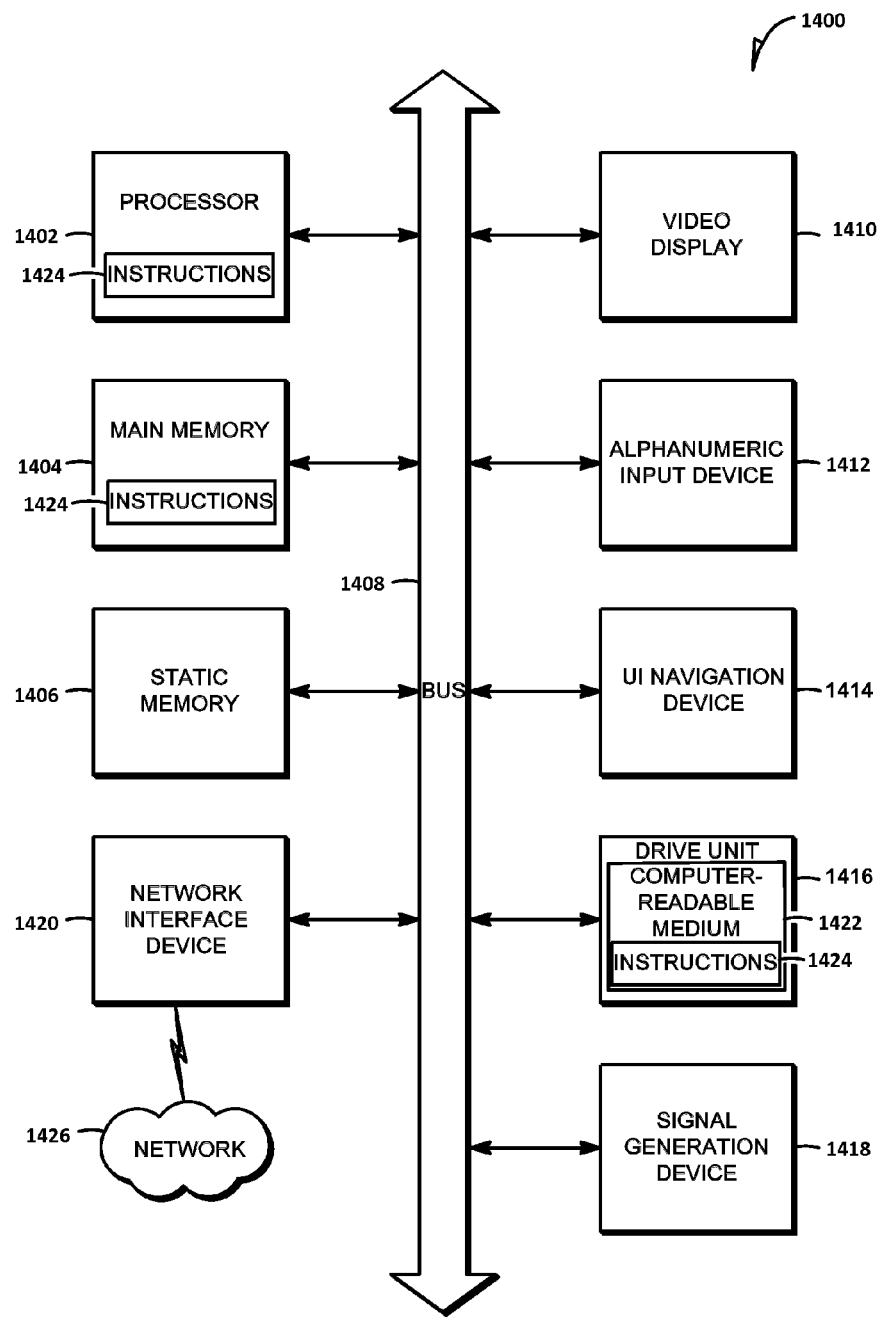
FIG. 14 shows a diagrammatic representation of machine, in the example form of a computer system, within which a set of instructions may be executed to cause the machine to perform any one or more of the methodologies discussed herein.

FIG. 14 shows a diagrammatic representation of a machine in the example form of a computer system 1400 within which a set of instructions 1424 may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine 110 or 112 in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 1424 (sequential or otherwise) that specify actions to be taken by that machine. Further, while only a single machine is illustrated, the term "machine" shall also be taken to include any collection of machines that individually or jointly execute a set (or multiple sets) of instructions 1424 to perform any one or more of the methodologies discussed herein.

The example computer system 1400 includes a processor 1402 (e.g., a central processing unit (CPU), a graphics processing unit (GPU, or both)), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a UI navigation device 1414 (e.g., a mouse), a disk drive unit 1416, a signal generation device 1418 (e.g., a speaker), and a network interface device 1420.

The disk drive unit 1416 includes a machine-readable medium 1422 on which is stored one or more sets of instructions and data structures (e.g., software 1424) embodying or utilized by any one or more of the methodologies or functions described herein. The instructions 1424 may also reside, completely or at least partially, within the main memory 1404 and/or within the processor 1402 during execution thereof by the computer system 1400, with the main memory 1404 and the processor 1402 also constituting machine-readable media.

The instructions 1424 may further be transmitted or received over a network 1426 via the network interface device 1420 utilizing any one of a number of well-known transfer protocols (e.g., HTTP).

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions 1424. The term "machine-readable medium" shall also be taken to include any medium that is capable of storing, encoding, or carrying a set of instructions 1424 for execution by the machine and that cause the machine to perform any one or more of the methodologies of the present disclosure, or that is capable of storing, encoding or carrying data structures utilized by or associated with such a set of instructions 1424. The term "machine-readable medium" shall, accordingly, be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A kiosk comprising:
a computer processor;
an input device coupled to the computer processor;
an electronic display unit coupled to the computer processor;
a plurality of compartments coupled to the computer processor; and
a communication port coupled to the computer processor, the communication port operable to couple the computer processor to a data communications network and a network-based transaction system;
the computer processor operable to:
receive via the input device an input from a seller of an item, the input comprising a listing of the item for sale on the network-based transaction system;
identify an available compartment from the plurality of compartments based on a weight and an image of the item for sale, the available compartment configured to receive the item for sale from the seller;
transmit an identification of the available compartment to the seller via the electronic display unit; and
enable access to the available compartment by the seller.

2. The kiosk of claim 1, wherein the computer processor is operable to receive an input from the network-based transaction system indicating a purchase of the item or indicating an expiration of a time period allotted for the purchase of the item.

3. The kiosk of claim 2, wherein when the input from the network-based transaction system indicates the purchase of the item, the computer processor is operable to:
transmit an electronic message to an agent of the network-based transaction system indicating the purchase of the item;
receive via the input device input from the agent of the network-based transaction system; and
in response to the input from the agent of the network-based transaction system, enable access to the available compartment for removal of the item from the available compartment for delivery of the item to a purchaser of the item.

4. The kiosk of claim 2, wherein when the input from the network-based transaction system indicates the purchase of the item, the computer processor is operable to:
receive via the input device an input from the purchaser of the item;
transmit the identification of the available compartment to the purchaser of the item; and
enable access to the available compartment by the purchaser of the item.

5. The kiosk of claim 2, wherein when the input from the network-based transaction system indicates an expiration of a time period allotted for the purchase of the item on the network-based transaction system, the computer processor is operable to:
transmit an electronic message to the seller informing the seller of the expiration of the time period;
receive via the input device input from the seller; and
enable access to the available compartment by the seller for retrieval of the item.

6. The kiosk of claim 2, wherein when the input from the network-based transaction system indicates an expiration of a time period allotted for the purchase of the item on the network-based transaction system, the computer processor is operable to:
receive input from the seller indicating that the seller will not retrieve the item from the kiosk.

7. The kiosk of claim 1, comprising an inventory of packaging and shipping material that is available to the agent of the network-based transaction system for packaging and shipping the item to a purchaser.

8. The kiosk of claim 1, comprising a weight scale.

9. The kiosk of claim 1, wherein the listing comprises a description of the item and the image of the item.

10. The kiosk of claim 1, wherein the computer processor is operable to receive the listing from the seller via a remote device over the data communications network.

11. The kiosk of claim 1, comprising a camera coupled to the computer processor.

12. A system comprising:
a computer server for a network-based transaction system, the computer server coupled to a kiosk via a data communications network;
the kiosk comprising a computer processor, an input device coupled to the computer processor, an electronic display unit coupled to the computer processor, a plurality of compartments coupled to the computer processor, and a data communications port coupled to the computer processor;
the computer server operable to:
receive input from a seller of an item, the input comprising a listing of the item for sale on the network-based transaction system;
identify an available compartment from the plurality of compartments based on a weight and an image of the item for sale, the available compartment configured to receive the item for sale from the seller;
transmit an identification of the available compartment to the seller via the electronic display unit; and
enable access to the available compartment by the seller.

13. The system of claim 12, wherein the computer server is operable to:
transmit a message to the kiosk indicating a purchase of the item listed for sale on the network-based transaction system or indicating an expiration of a time period allotted for purchase of the item on the network-based transaction system.

14. The system of claim 13, wherein when the message from the network-based transaction system indicates the purchase of the item, the computer server is operable to:
   transmit an electronic message to an agent of the network-based transaction system indicating the purchase of the item;
   receive via the input device input from the agent of the network-based transaction system; and
   in response to the input from the agent of the network-based transaction system, enable access to the available compartment by the agent for removal of the item from the compartment for delivery of the item to a purchaser of the item.

15. The system of claim 13, wherein when the message from the network-based transaction system indicates the purchase of the item, the computer server is operable to:
   receive an input from the purchaser of the item;
   transmit the identification of the available compartment to the purchaser of the item; and
   enable access to the available compartment by the purchaser of the item.

16. The system of claim 13, wherein when the message from the network-based transaction system indicates an expiration of a time period allotted for the purchase of the item, the computer server is operable to:
   transmit an electronic message to the seller of the item informing the seller of the expiration of the time period;
   receive input from the seller; and
   enable access to the available compartment by the seller for retrieval of the item.

17. The system of claim 13, wherein when the message from the network-based transaction system indicates an expiration of a time period allotted for the purchase of the item, the computer server is operable to:
   receive input from the seller indicating that the seller will not retrieve the item from the kiosk.

18. The system of claim 12, wherein the kiosk comprises an inventory of packaging and shipping material that is available to an agent of the network-based transaction system for packaging and shipping the item to a purchaser.

19. The system of claim 12, wherein the kiosk comprises a weight scale.

20. The system of claim 12, wherein the listing comprises a description of the item and the image of the item.

* * * * *